US010686725B2

(12) United States Patent
Balmakhtar et al.

(10) Patent No.: US 10,686,725 B2
(45) Date of Patent: Jun. 16, 2020

(54) SOFTWARE DEFINED NETWORK (SDN) QUALITY-OF-SERVICE (QOS)

(71) Applicant: Sprint Communications Company L.P., Overland Park, KS (US)

(72) Inventors: Marouane Balmakhtar, Dumfries, VA (US); Arun Rajagopal, Leawood, KS (US)

(73) Assignee: Sprint Communications Company L.P., Overland Park, KS (US)

(*) Notice: Subject to any disclaimer, the term of this patent is extended or adjusted under 35 U.S.C. 154(b) by 38 days.

(21) Appl. No.: 16/017,005

(22) Filed: Jun. 25, 2018

(65) Prior Publication Data
US 2018/0302336 A1   Oct. 18, 2018

Related U.S. Application Data (63) Continuation of application No. 15/057,300, filed on Mar. 1, 2016, now Pat. No. 10,033,660.

(51) Int. Cl.
*H04L 12/927* (2013.01)
*H04L 12/26* (2006.01)
(Continued)

(52) U.S. Cl.
CPC ........ *H04L 47/805* (2013.01); *H04L 41/5009* (2013.01); *H04L 43/08* (2013.01);
(Continued)

(58) Field of Classification Search
CPC . H04L 41/5009; H04L 43/08; H04L 43/0852; H04L 43/12; H04L 47/805; H04L 45/64
See application file for complete search history.

(56) References Cited

U.S. PATENT DOCUMENTS

| | | |
|---|---|---|
| 2014/0280835 A1 | 9/2014 | Pruss et al. |
| 2015/0052243 A1 | 2/2015 | Lumezanu et al. |

(Continued)

FOREIGN PATENT DOCUMENTS

| | | |
|---|---|---|
| CN | 103795596 | 5/2014 |
| WO | 2014128265 | 8/2014 |
| WO | 2015053788 | 4/2015 |

OTHER PUBLICATIONS

Pedro Heleno Isolani, et al; Interactive Monitoring, Visualization, and Configuration of OpenFlow-Based SDN. 2015 IFIP/IEEE International Symposium on Integrated Network Management (IM), May 15, 2015 (May 15, 2015), pp. 207-215, XP855368546.

(Continued)

*Primary Examiner* — Edan Orgad
*Assistant Examiner* — Nourali Mansoury (57) ABSTRACT

A Software-Defined Network (SDN) controller receives controller Application Programming Interface (API) calls from an SDN application and transfers SDN data machine API calls. SDN data machines receive the SDN data machine API calls and process user data responsive to the SDN data machine API calls. The SDN controller transfers SDN controller Key Performance Indicators (KPIs) that indicate an amount of the SDN application API calls for the SDN data machine API calls. The SDN data machines transfers SDN data machine KPIs that indicate an amount of the processed user data for the SDN data machine API calls. An SDN server receives the SDN data machine KPIs and the SDN controller KPIs. The SDN server determines an SDN Quality-of-Service (QoS) score for a data communication service based on the amount of the SDN application API calls relative to the corresponding amount of the processed user data.

18 Claims, 6 Drawing Sheets (51) Int. Cl.
H04L 12/715 (2013.01)
H04L 12/24 (2006.01)
(52) U.S. Cl.
CPC .............. *H04L 43/12* (2013.01); *H04L 45/64* (2013.01); *H04L 43/0852* (2013.01)

(56) References Cited

U.S. PATENT DOCUMENTS

2015/0113132 A1 4/2015 Srinivas et al.
2015/0124622 A1 5/2015 Kovvali et al.
2015/0142962 A1 5/2015 Srinivas et al.
2015/0263906 A1 9/2015 Katsuri et al.

OTHER PUBLICATIONS

PCT/US2017/019835, Notification of Transmittal of the International Search Report and the Written Opinion of the International Searching Authority, dated May 11, 2017, 16 pages.

SOFTWARE DEFINED NETWORK (SDN) QUALITY-OF-SERVICE (QOS)

RELATED CASES

This patent application is a continuation of U.S. patent application Ser. No. 15/057,300 that was filed on Mar. 1, 2016 and is entitled, "SOFTWARE DEFINED NETWORK (SDN) QUALITY-OF-SERVICE (QoS)." U.S. patent application Ser. No. 15/057,300 is hereby incorporated by reference into this patent application.

TECHNICAL BACKGROUND

Data communication systems exchange user data for user devices to provide various data communication services. The user devices may be phones, computers, media players, and the like. The data communication services might be media streaming, audio/video conferencing, data messaging, or internet access. Software-Defined Networks (SDNs) have become a popular data communication system to deliver these data communication services.

An SDN has applications, controllers, and data machines. The SDN controllers expose network-level control-plane Application Programming Interfaces (APIs) to the SDN applications. The SDN applications call these SDN controller APIs to implement the data communication services. In a like manner, the SDN data machines expose network-level data-plane APIs to the SDN controllers. The SDN controllers call these SDN data machine APIs to implement the data communication services. The SDN data machines process user data in response to the SDN data machine API calls.

For example, an SDN application may determine that an update to an SDN Flow Descriptor Table (FDT) is required to support a user data service. The SDN application calls a controller API with the FDT update. The SDN controller calls a data machine API with the FDT update. The SDN data machine updates its FDT responsive to the data machine API call from the SDN controller. Subsequently, the SDN data machine receives user data packets, matches the packet addresses to an action in the updated FDT, and performs the action on the user data packets. The SDN data machines may forward, drop, or store the user data packets based on the FDT.

Many SDNs run on Network Function Virtualization (NFV) computer systems. NFV computer systems have Virtual Network Functions (VNFs) that perform like typical communication network elements or portions of these network elements. The VNFs run under the control of hypervisors that control VNF access to NFV hardware (circuitry, memory, communication interfaces). To implement a data communication service, an NFV Management and Orchestration (MANO) system drives the NFV hardware to execute and support the VNFs based on NFV service descriptors for the data communication service. In NFV-SDN systems, the VNFs may be SDN applications, SDN controllers, and SDN virtual data machines.

Unfortunately, the ability to manage Quality-of-Service (QoS) in SDNs is not effective. In particular, current NFV-SDN systems do not support the efficient and effective measurement and scoring of SDN QoS.

TECHNICAL OVERVIEW

A Software-Defined Network (SDN) controller receives controller Application Programming Interface (API) calls from an SDN application and transfers SDN data machine API calls. SDN data machines receive the SDN data machine API calls and process user data responsive to the SDN data machine API calls. The SDN controller transfers SDN controller Key Performance Indicators (KPIs) that indicate an amount of the SDN application API calls for the SDN data machine API calls. The SDN data machines transfers SDN data machine KPIs that indicate an amount of the processed user data for the SDN data machine API calls. An SDN server receives the SDN data machine KPIs and the SDN controller KPIs. The SDN server determines an SDN Quality-of-Service (QoS) score for a data communication service based on the amount of the SDN application API calls relative to the corresponding amount of the processed user data.

DETAILED DESCRIPTION

Figure 1:
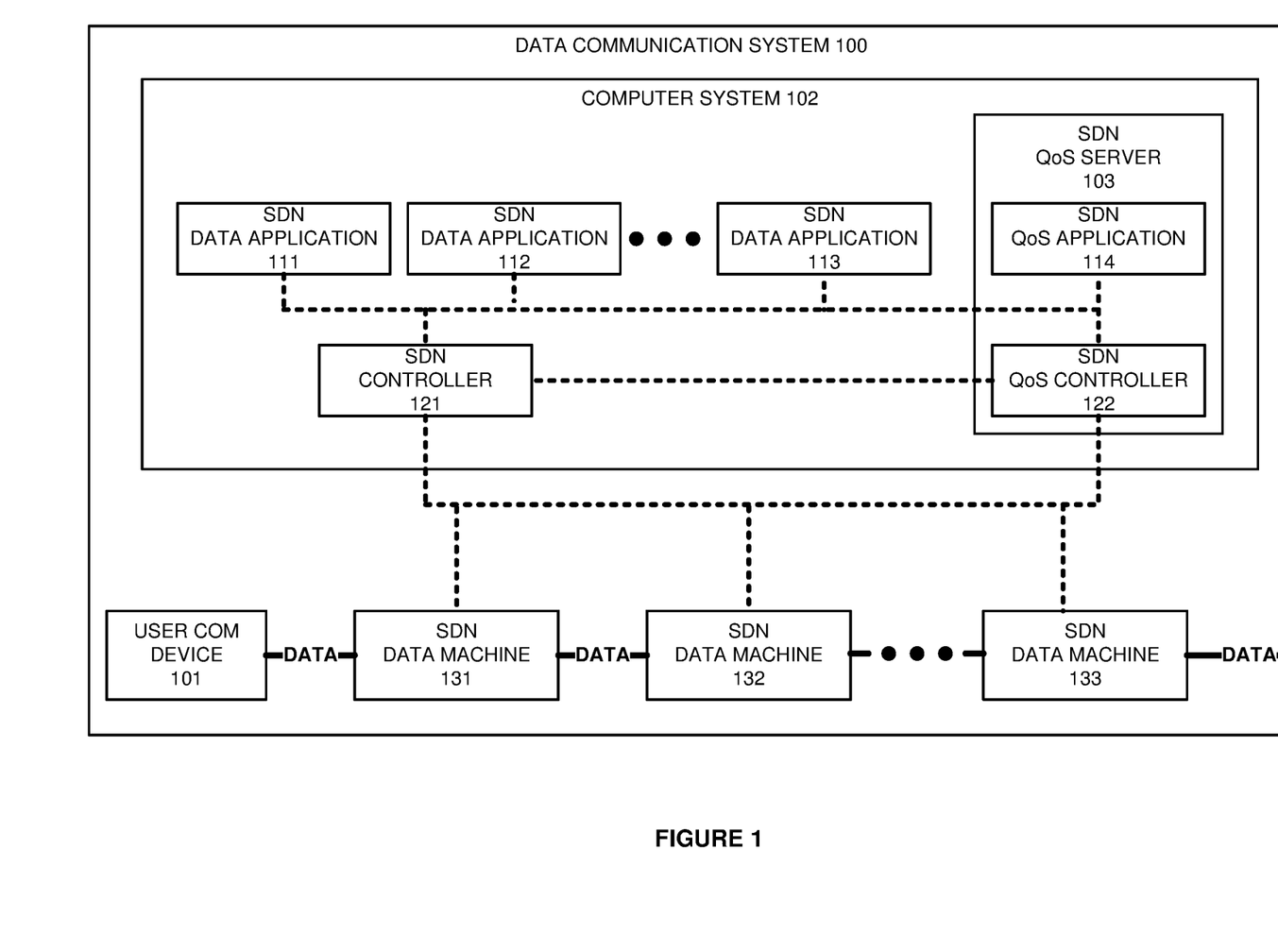
FIG. 1 illustrates a data communication network to determine Software Defined Network (SDN) Quality-of-Service (QoS).

FIG. 1 illustrates data communication system 100 to determine Software Defined Network (SDN) Quality-of-Service (QoS). Data communication system 100 exchanges user data for user communication device 101. User communication device 101 comprises a computer, phone, media player, or some other intelligent machine with a communication transceiver. The data exchange supports a data communication service such as media streaming, audio/video conferencing, messaging, internet access, or some other information service. Data communication network 100 comprises user communication device 101, computer system 102, and SDN data machines 131-133. Computer system 102 comprises SDN applications 111-113, SDN controller 121, and SDN QoS server 103. SDN QoS server 103 comprises SDN QoS application 114 and SDN QoS controller 122.

In data communication system 100, computer system 102 and SDN data machines 131-133 comprise data processing circuitry, data memory, operating software, and data communication interfaces. The virtual links use the processing circuitry and data memory under the control of the operating software. The physical links use media such as air, metal, and/or glass, and may include intermediate data devices, systems, and networks. The physical links use protocols like Long Term Evolution (LTE), Wireless Fidelity (WiFi), Ethernet, Wave Division Multiplexing (WDM), Ethernet, Data over Cable System Interface Specification (DOCSIS), Internet Protocol (IP), and/or some other data communication format—including combinations thereof.

SDN applications 111-113 are linked to SDN controller 121 over a northbound SDN interface. SDN controller 121 is linked to SDN data machines 131-133 over a southbound SDN interface. SDN data machine 131 is linked to user communication device 101. SDN data machine 132 is linked to SDN data machines 131 and 133. SDN data machine 133 is linked to an external system (not shown). SDN QoS application 114 is linked to SDN applications 111-113. SDN QoS application 114 is linked to SDN QoS controller 122. SDN QoS controller 122 is linked to SDN controller 121. SDN QoS controller 122 is linked to SDN data machines 131-133 over the southbound interface.

To deliver the particular data communication service, SDN applications 111-113 and SDN controller 121 execute on computer system 102. SDN applications 111-113 transfer SDN controller Application Programming Interface (API) calls to SDN controller 121. SDN controller 121 receives and processes the SDN controller API calls to generate and transfer SDN data machine API calls. SDN controller 121 transfers the SDN data machine API calls to SDN data machines 131-133. SDN data machines 131-133 receive and process the SDN data machine API calls to perform SDN actions on user data and also to transfer SDN data machine API responses. SDN controller 121 receives the SDN data machine API responses. SDN controller 121 processes the SDN data machine API responses to generate and transfers SDN controller responses to SDN applications 111-113.

To determine the SDN QoS for a data communication service, SDN applications 111-113 measure SDN application Key Performance Indicators (KPIs) and transfer SDN application KPI data to SDN QoS application 114—perhaps through SDN controllers 121-122. The KPIs may comprise fairly raw metrics like total southbound messages per hour, or they may be more advanced like a moving average execution time for a specific type of data machine table update. The logical distribution of advanced KPI development between the SDN systems and the QoS systems may vary.

SDN controller 121 measures SDN controller KPIs and transfers SDN controller KPI data to SDN QoS controller 122. SDN data machines measure SDN data machine KPIs and transfer SDN data machine KPI data to SDN QoS controller 122—perhaps through SDN controller 121. SDN QoS controller 122 transfers the SDN controller KPI data and the SDN data machine KPI data to SDN QoS application 114. SDN QoS application 114 processes the SDN KPI data from SDN applications 111-113, controller 121, and data machines 131-133 to generate an SDN QoS score.

For example, SDN QoS application 114 may process the KPI data to determine an amount of SDN controller API calls and responses over the northbound interface—and this metric may be its own KPI. SDN QoS application 114 may then process the KPI data to determine a corresponding amount of user data handled by SDN data machines 131-133 based on these northbound API calls and responses—and this metric may be its own KPI. Likewise, SDN QoS application 114 may process the KPI data to determine an amount of SDN data machine API calls and responses over the southbound interface to determine a corresponding amount of the user data handled by SDN data machines 131-133 based on the southbound API calls and responses. Thus, SDN QoS application 114 develops a QoS score in the very helpful form of a ratio of SDN chatter to the amount of processed user data.

In another example, SDN applications 111-113 measure SDN controller response times based the SDN controller API calls and the SDN controller API responses—and this metric may be its own KPI. SDN QoS application 114 generates the SDN QoS score based on the SDN controller response times. Likewise, SDN controller 121 measures SDN data machine response times based the SDN data machine API calls and the SDN data machine API responses—and this metric may be its own KPI. SDN QoS application 114 generates the SDN QoS score based on the SDN data machine response times.

SDN controller 121 may measure SDN data machine Flow Descriptor Table (FDT) update times based the SDN data machine API calls and the SDN data machine API responses. Likewise, SDN applications 111-113 may also measure SDN FDT update times based the SDN controller API calls and the SDN controller API responses. These and other FDT update metrics may also comprise KPIs. SDN QoS application 114 generates the SDN QoS score based on the SDN data machine FDT update times. Thus, SDN QoS application 114 develops a QoS score in the useful form of an SDN northbound and southbound response times—including FDT update times.

SDN data machines 131-133 establish user data flows based on user data identifiers. The user data identifiers are typically packet header information like Internet Protocol (IP) address and port, Ethernet address and port, multi-protocol label, and the like. For example, SDN data machine 131 may receive FDT data indicating a user data IP prefix and an SDN machine port, and in response to a packet having the IP prefix, the SDN machine forwards the IP packet over the designated SDN machine port. Other actions like storing, dropping, and flooding may be performed. SDN QoS application 114 may generate a specific SDN QoS score for a particular user data identifier and its corresponding user data flow. Thus, SDN QoS application 114 may generate SDN QoS scores based on response times and chatter for a particular IP prefix, IP address/port, Ethernet Virtual Local Area Network (VLAN) ID, or the like.

In examples where computer system 102 comprises a Network Function Virtualization Infrastructure (NFVI), the data communication service will have a Network Function Virtualization (NFV) service descriptor, a forwarding graph, and Virtual Network Functions (VNFs). SDN applications 111-113 then comprise NFV VNFs executing on the NFVI. The SDN application VNFs transfer the SDN application KPI data. Likewise, SDN controller 121 comprises SDN controller VNFs executing on the NFVI. The SDN controller VNFs transfer the SDN controller KPI data. The KPI data transferred by the SDN VNFs and data machines may now indicate the pertinent NFV service descriptors, forwarding graphs, and VNFs. SDN QoS server 103 may then process the KPI data indicating the NFV service descriptors to generate an SDN QoS score specific to the NFV service descriptor. SDN QoS server 103 may process the KPI data indicating an NFV forwarding graph to generate an SDN QoS score specific to the NFV forwarding graph. SDN QoS server 103 may process the KPI data indicating a specific SDN VNF to generate an SDN QoS score specific to the SDN VNF. Thus, SDN QoS application 114 may generate SDN QoS scores based on response times and chatter for a particular NFV service descriptor, forwarding graph, or VNF.

Figure 2:
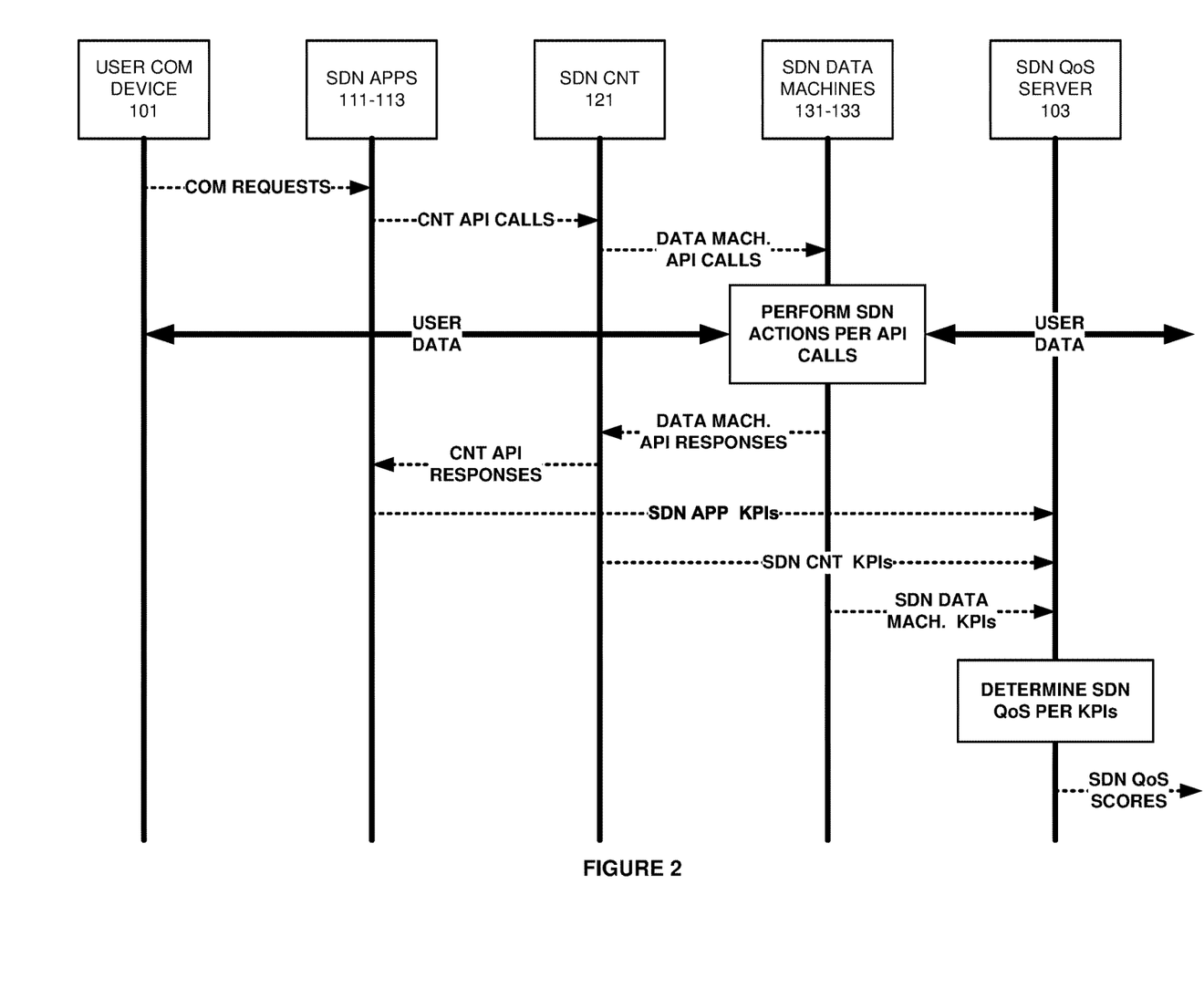
FIG. 2 illustrates the operation of the data communication network to determine SDN QoS.

FIG. 2 illustrates the operation of data communication system 100 to determine SDN QoS. User communication device 101 transfer communication requests to one or more SDN applications 111-113. SDN applications 111-113 transfer SDN controller API calls to SDN controller 121. SDN controller 121 receives and processes the SDN controller API calls to generate and transfer SDN data machine API calls to SDN data machines 131-133. SDN data machines 131-133 receive and process the SDN data machine API calls to perform SDN actions on the user data and to transfer SDN data machine API responses to SDN controller 121. SDN controller 121 receives and processes the SDN data machine API responses to generate and transfer SDN controller API responses to SDN applications 111-113.

To determine SDN QoS for the data communication service, SDN applications 111-113 measure SDN application KPIs and transfer SDN application KPI data to SDN QoS server 103. SDN controller 121 measures SDN controller KPIs and transfers SDN controller KPI data to SDN QoS server 103. SDN data machines 131-133 measure SDN data machine KPIs and transfer SDN data machine KPI data to SDN QoS server 103. SDN QoS server 103 processes the SDN application KPI data, the SDN controller KPI data, and the SDN data machine KPI data to generate the various SDN QoS scores as described above. SDN QoS server 103 transfers the SDN QoS scores to other systems for use in network management and service optimization.

For example, SDN QoS server 103 determines the amount of the controller and/or data machine API calls and/or responses that are related to a given data communication service during a specified time period. SDN QoS server 103 also determines the corresponding amount of the user data handled by SDN data machines 131-133 during the time period based on these API calls and/or responses. Thus, SDN QoS server 103 may develop ratios of SDN API calls to user data amounts in the northbound SDN control-plane and/or the southbound SDN data-plane. In examples where computer system 102 comprises an NFVI, the KPI data indicates NFV service descriptors, forwarding graphs, and VNFs. SDN QoS server 103 may then process the KPI data indicating a select service descriptor, forwarding graph, or VNF to generate an individual SDN QoS score for that service descriptor, forwarding graph, or VNF.

Figure 3:
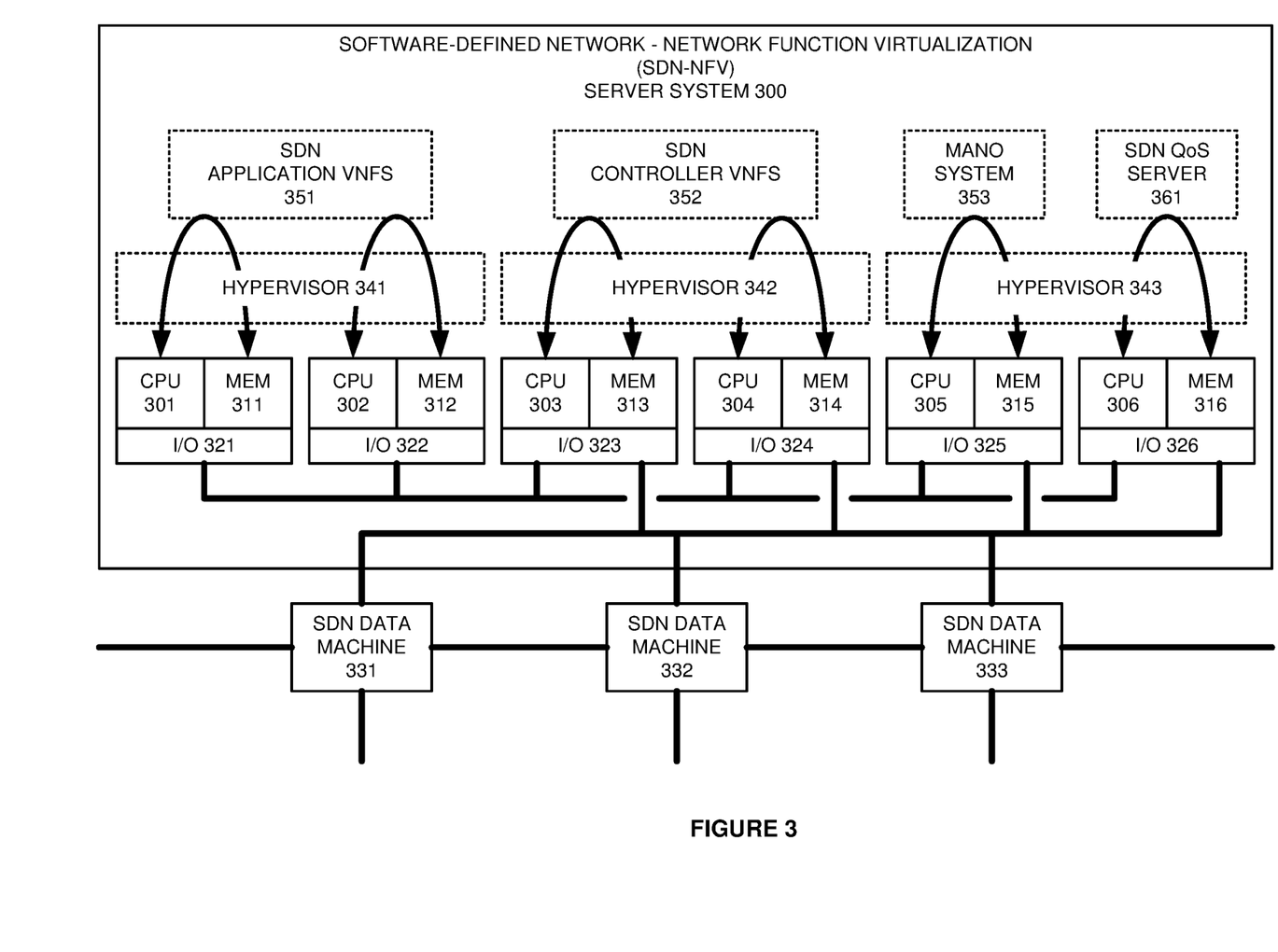
FIG. 3 illustrates an SDN-Network Function Virtualization (NFV) server system to generate SDN QoS scores for NFV data services.

FIG. 3 illustrates Software-Defined Network (SDN)-Network Function Virtualization (NFV) server system 300 to generate SDN QoS scores for NFV data services. SDN-NFV server system 300 is an example of data communication system 100, although system 100 may use alternative configurations and operations. SDN/NFV server system 300 comprises Central Processing Units (CPUs) 301-306, memories 311-316, and Input/Output (I/O) ports 321-326. I/O ports 323-326 are coupled to SDN data machines 331-334. The amount of CPUs, memory, I/O, and software components has been restricted for clarity.

SDN/NFV server system 300 includes hypervisors 341-343. SDN application VNFs 351 traverse between CPUs 301-302 and memories 311-312 under the control of hypervisor 341. SDN controller VNFs 352 traverse between CPUs 303-304 and memories 313-314 under the control of hypervisor 342. Software and data for MANO system 353 and SDN QoS server 361 traverse between CPUs 305-306 and memories 315-316 under the control of hypervisor 343. MANO system 353 directs hypervisors 341-342 to retrieve VNFs 351-352 from memories 311-314 and to execute VNFs 351-352 on the appropriate CPUs 301-304. MANO 353 also directs hypervisors 341-342 to control which memories 311-314 and I/O ports 321-325 are used by VNFs 351-352 and their data.

To deliver a data communication service, MANO system 353 processes an NFV service descriptor. The NFV service descriptor drives MANO system 353 to direct hypervisors 341-342 to execute and support SDN VNFs 351-352. Responsive to user data needs, SDN application VNFs 351 transfer SDN API calls to SDN controller VNFs 352. SDN controller VNFs 352 process the SDN controller API calls to generate and transfer SDN data machine API calls. SDN controller VNFs 352 transfer the SDN data machine API calls to SDN data machines 331-333. SDN data machines 331-333 receive and process the SDN data machine API calls to perform SDN actions on user data and also to transfer SDN data machine API responses. SDN controller VNFs 352 receives the SDN data machine API responses. SDN controller VNFs 352 process the SDN data machine API responses to generate and transfer SDN controller responses to SDN application VNFs 351.

To determine the SDN QoS for the data communication service, SDN application VNFs 351 measure SDN application KPIs and transfer SDN application KPI data to SDN QoS server 361. SDN controller VNFs 352 measure SDN controller KPIs and transfer SDN controller KPI data to SDN QoS server 361. This KPI data flow may traverse a VNF Manager (VNFM) and Orchestrator in MANO system 353. SDN data machines 331-333 measure SDN data machine KPIs and transfer SDN data machine KPI data to SDN QoS server 361—perhaps through SDN controller VNFs 352, the VNFM, and Orchestrator. SDN QoS server 361 processes the SDN KPI data from SDN application VNFs 351, SDN controller VNFs 352, and data machines 331-333 to generate various SDN-NFV QoS scores.

For example, SDN QoS server 361 may process the KPI data to determine an amount of SDN controller API chatter relative to the amount of user data handled by SDN data machines 331-333 based on this northbound SDN chatter. Likewise, SDN QoS server 361 may process the KPI data to determine an amount of SDN data machine chatter in relation to the corresponding amount of the user data handled by SDN data machines 331-333 based on the southbound SDN chatter.

In another example, SDN application VNFs 351 measure SDN controller VNFs 352 response times based the SDN controller API calls and the SDN controller API responses. SDN QoS server 361 generates SDN QoS scores based on SDN controller VNFs 352 response times. Likewise, SDN controller VNFs 352 measures SDN data machine response times based the SDN data machine API calls and the SDN data machine API responses. SDN QoS server 361 generates SDN QoS scores based on the SDN data machine response times. SDN control VNFs 352 may measure SDN data machine FDT update times based the SDN data machine chatter. Likewise, SDN application VNFs 351 may also measure SDN FDT update times based the SDN chatter. SDN QoS server 361 generates SDN QoS scores based on the SDN data machine FDT update times. Thus, SDN QoS server 361 develops QoS scores for SDN northbound and southbound response times—including FDT update times.

In SDN-NFV server 300, a given data communication service has an NFV service descriptor, forwarding graphs, and VNFs. The KPI data transferred by the SDN VNFs 351-352 and data machines 331-333 now indicates the NFV service descriptors, forwarding graphs, and VNFs that support the service. SDN QoS server 361 may then process the KPI data to generate SDN QoS scores specific to the NFV service descriptor. SDN QoS server 361 may process the KPI data indicating an NFV forwarding graph to generate SDN QoS scores specific to the NFV forwarding graph. SDN QoS server 361 may also process the KPI data indicating a specific VNF or set of VNFs to generate SDN QoS scores specific to those VNFs. Thus, SDN QoS server 361 generates SDN QoS scores based on SDN response times and chatter for particular NFV service descriptors, forwarding graphs, and/or VNFs.

Figure 4:
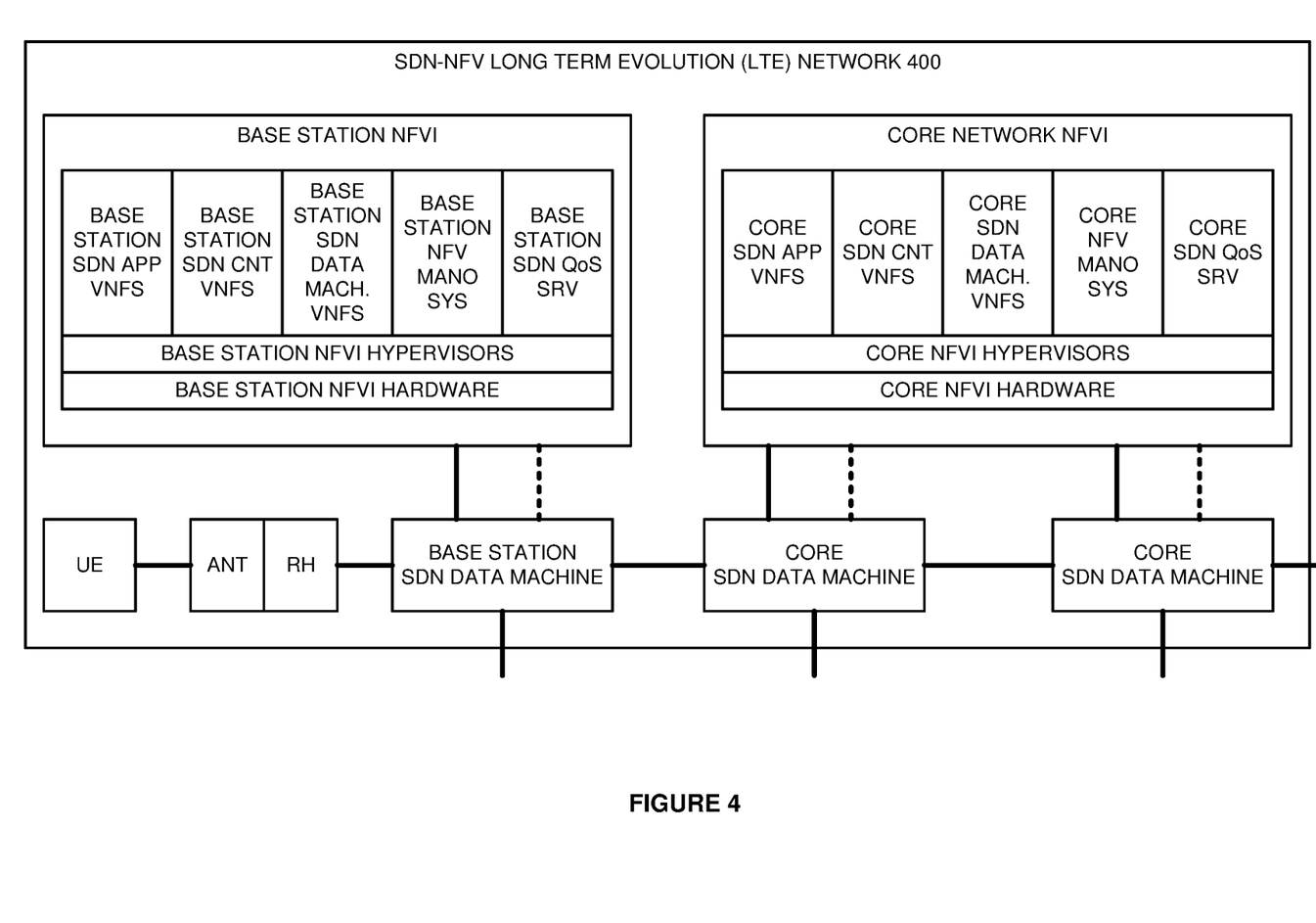
FIG. 4 illustrates an SDN-NFV Long Term Evolution (LTE) network to generate SDN QoS scores for LTE network services.

FIG. 4 illustrates SDN-NFV Long Term Evolution (LTE) network 400 to generate SDN QoS scores for LTE network services. SDN-NFV LTE network 400 is an example of data communication system 100, although system 100 may use alternative configurations and operations. SDN-NFV LTE network 400 comprises: User Equipment (UE), Antenna (ANT), Radio Head (RH), base station NFVI, base station SDN data machine, core NFVI, and core SDN data machines. The base station NFVI and the core NFVI comprise hardware like CPU cores, data memories, and I/O transceivers. The NFVI hardware executes hypervisor software to provide a virtualized processing environment. Under the control of the MANO systems, the hypervisors execute various VNFs to exchange user data for the UE.

In the base station NFVI, the hypervisors execute SDN application VNFs like Baseband (BB), Media Access Control (MAC), Radio Link Control (RLC), Packet Data Convergence Protocol (PDCP), Radio Resource Control (RRC), Ethernet, IP, User Data Protocol (UDP), General Packet Radio Service Transfer Protocol (GTP), and S1-MME signaling. In the core NFVI, the hypervisors execute SDN application VNFs like Serving Gateway (S-GW), Mobility Management Entity (MME), Home Subscriber System (HSS), Secure Gateway (Se-GW), Application Server (AS), Packet Data Network Gateway (P-GW), Policy Charging Rules Function (PCRF), Proxy Call State Control Function (P-CSCF), Interrogating CSCF (I-CSCF), and Service CSCF (S-CSCF).

To set-up a data session, the UE transfers a communication request to a base station application VNF. The request may comprise a Radio Resource Control (RRC) data element coupled with a Non-Access Stratum (NAS) instruction. The base station application VNF informs other base station application VNFs, and one of the base station application VNFs informs one of the core SDN application VNFs. In response, the core SDN application VNFs authorize the UE, select an Application Point Name (APN), and invoke a network bearer for the APN. One of the core SDN application VNF notifies the pertinent base station application VNF of the authorization, APN, and network bearer.

The base station application VNFs transfer SDN controller API calls for the use data session to the base station controller VNFs, and the base station controller VNFs transfer SDN data machine API calls for the user data session to the base station SDN data machine. API responses flow back to the base station controller VNFs and application VNFs. Likewise, the core application VNFs transfer SDN controller API calls for the user data session to the core controller VNFs, and the core controller VNFs transfer SDN data machine API calls for the user data session to the core SDN data machines. API responses flow back to the core controller VNFs and application VNFs. The network bearer traverses the UE, antenna, radio head, and the SDN data machines. If needed, the SDN application VNFs may direct the SDN controller VNFs to drive the SDN data machines to deliver user data to an NFVI for heavier processing by the base station data machine VNFs or the core data machine VNFs. For example, a given flow may be directed through a core data machine VNF to perform transcoding, filtering, encryption, or the like.

The base station SDN application and controller VNFs measure and transfer their SDN KPIs to the base station SDN QoS server. The base station SDN QoS server transfers these base station SDN KPIs to the core SDN QoS server. The core SDN application and controller VNFs measure and transfer their SDN KPIs to the core SDN QoS server. The core SDN QoS server. The KPI data flow may traverse VNFMs and Orchestrators in the base station and/or core NFV MANO systems. The SDN data machines measure SDN data machine KPIs and transfer SDN data machine KPI data to the core SDN QoS server 361—perhaps through the SDN controller VNFs, VNFMs, and Orchestrator. The core SDN QoS server processes the SDN KPI data from the base station SDN VNFs, core SDN VNFs, and the SDN data machines to generate various SDN-NFV QoS scores for various LTE data communication services.

For example, the core SDN QoS server may process the KPI data to determine amounts of northbound and/or southbound chatter relative to amounts of processed user data at the base station and/or core NFVI. In another example, the core SDN QoS server may process the KPI data to determine northbound and/or southbound response times. The core SDN QoS server may process the KPI data to generate SDN QoS scores based on SDN data machine FDT update times at the base station NFVI and/or the core NFVI.

In SDN-NFV LTE network 400, a given data communication service has an NFV service descriptor, forwarding graphs, and VNFs. The KPI data transferred by the SDN VNFs and data machines may indicate the applicable NFV service descriptors, forwarding graphs, and VNFs that support the given service. The core SDN QoS server may then process the KPI data to generate SDN QoS scores specific to an NFV service descriptor, forwarding graph, or VNF.

Figure 5:
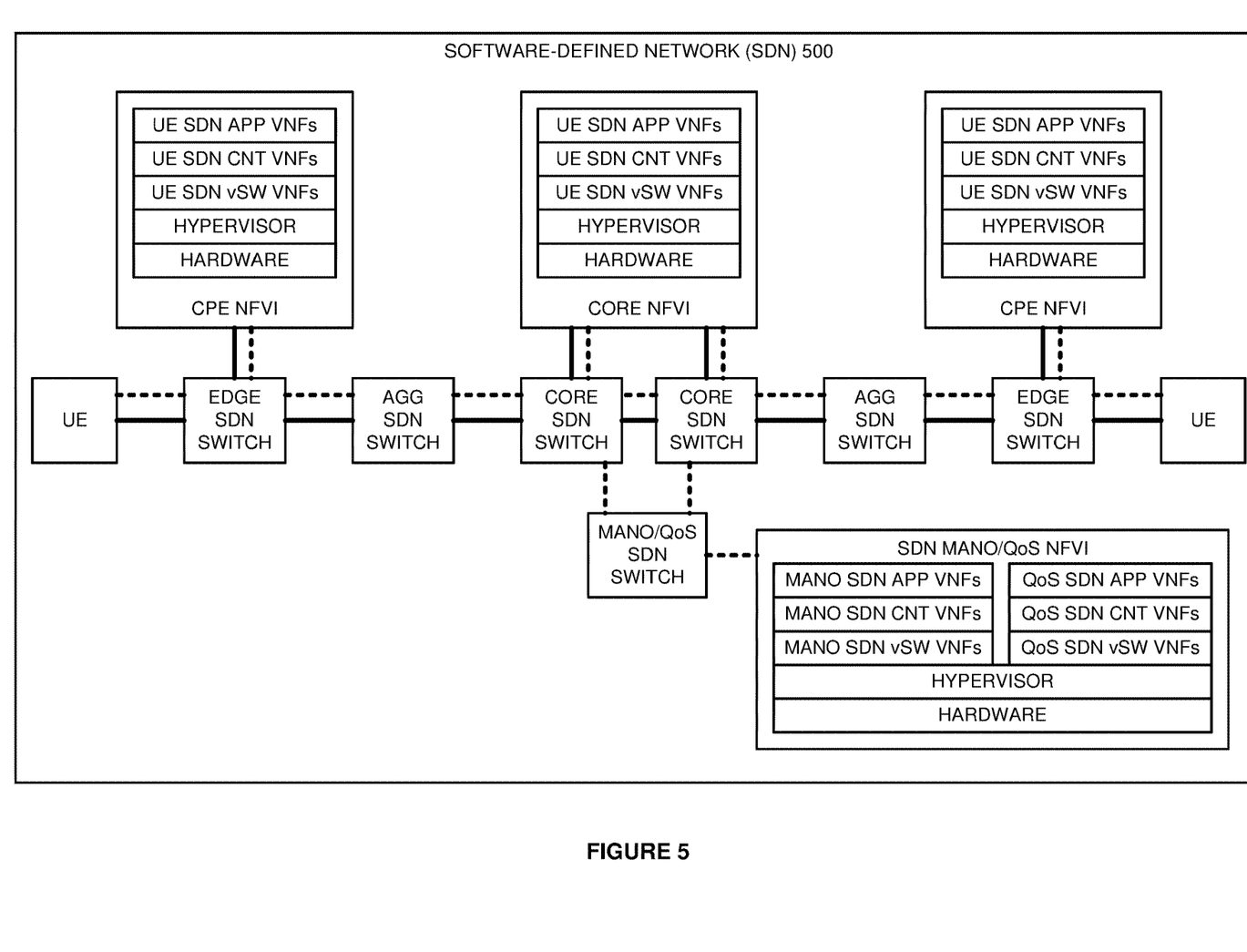
FIG. 5 illustrates an SDN to generate SDN QoS scores for SDN data communication services.

FIG. 5 illustrates Software-Defined Network (SDN) 500 to generate SDN QoS scores for SDN data communication services. SDN 500 is an example of data communication system 100, although system 100 may use alternative configurations and operations. SDN 500 comprises: User Equipment (UE), edge SDN switches, aggregation (AGG) SDN switches, core SDN switches, a MANO/QoS SDN switch, CPE NFVIs, a core NFVI, and a MANO/QoS NFVI. The NFVIs comprise hardware such as CPU cores, flash memories, and I/O transceivers.

The NFVIs execute hypervisor software to provide a virtualized processing environment. Under the control of the MANO system, the hypervisors execute various SDN VNFs. In the NFVIs, the hypervisors execute UE SDN virtual switch (vSW) VNFs, UE SDN controller (CNT) VNFs, and UE SDN application (APP) VNFs. In the MANO/QoS NFVI, the hypervisor executes MANO SDN vSW VNFs, MANO SDN CNT VNFs, MANO SDN APP VNFs, QoS SDN vSW VNFs, QoS SDN CNT VNFs, and QoS SDN APP VNFs.

The MANO VNFs transfer networking data to the core NFVI hypervisors and the CPE NFVI hypervisors to drive the execution of the UE SDN VNFs. To set-up a data session, between the UEs, one of the UEs transfers a session request to a CPE UE SDN application VNF. The CPE application VNF informs other CPE application VNFs, and one of the CPE application VNFs informs one of the core SDN application VNFs. In response, the core SDN application VNFs interact with the destination CPE application VNFs to extend the session.

The CPE and core application VNFs transfer SDN controller API calls for the UE session to their associated CPE and core controller VNFs. The CPE and controller VNFs transfer SDN data machine API calls to the SDN switches data machine. API responses flow back to from the switches to the controller VNFs and to the application VNFs. If needed, an SDN application VNF may direct an SDN controller VNF to drive an SDN data machine to deliver user data to an NFVI for heavier processing by the UE SDN vSW VNFs. For example, a given flow may be directed to a core SDN vSW to perform transcoding, filtering, decryption, or the like.

The UE SDN VNFs in the CPE and core NFVIs generate SDN KPI data as described herein. The SDN switches also generate SDN KPI data. The QoS VNFs exchange the SDN KPI data with the UE SDN VNFs and the SDN switches. The MANO VNFs may exchange the SDN KPI data between the UE SDN VNFs and the QoS VNFs. The UE SDN VNFs and MANO VNFs may exchange the SDN KPI data between the SDN switches and the QoS VNFs.

The QoS SDN application VNFs process the SDN KPI data from the CPE SDN VNFs, core SDN VNFs, and SDN switches to generate various SDN-NFV QoS scores for various SDN-NFV data services. For example, the QoS SDN application VNFs may process the KPI data to determine amounts of northbound and/or southbound chatter relative to amounts of processed user data at the CPE and/or core NFVI. In another example, the QoS SDN application VNFs may process the KPI data to determine northbound and/or southbound response times like the how long it takes a UE SDN application VNF to update an FDT in an edge SDN switch.

In SDN 500, a given data communication service has an NFV service descriptor, forwarding graphs, and VNFs. The KPI data transferred by the UE SDN VNFs and data switches may indicate the applicable NFV service descriptors, forwarding graphs, and VNFs that support the service. The SDN QoS application VNFs may then process the KPI data to generate SDN QoS scores that are specific to an NFV service descriptor, forwarding graph, or VNF.

Figure 6:
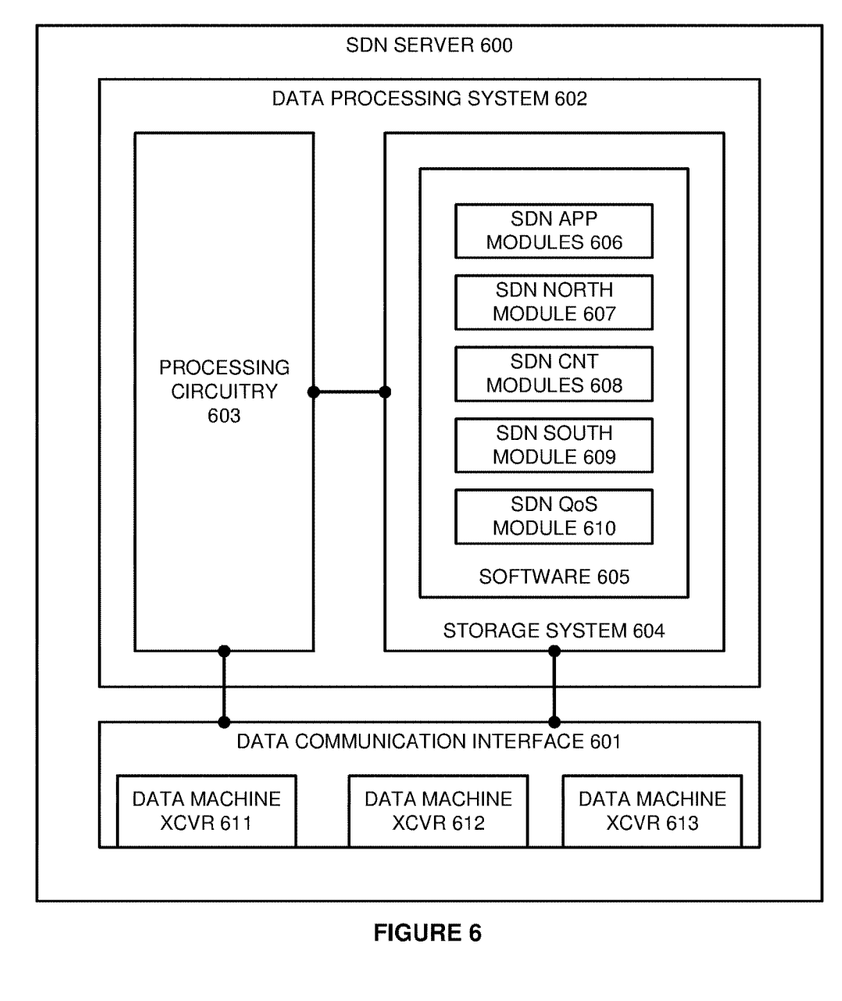
FIG. 6 illustrates an SDN server to generate SDN QoS scores for SDN data communication services.

FIG. 6 illustrates SDN server 600 to generate SDN QoS scores for SDN data communication services. SDN server 600 comprises data communication interface 601 and data processing system 602. Data communication interface 601 comprises data machine transceivers 611-616. Data processing system 602 comprises processing circuitry 603 and storage system 604. Storage system 604 stores software 605. Software 605 includes respective software modules 606-610.

Data machine transceivers 611-613 comprise communication components, such as ports, bus interfaces, signal processors, memory, software, and the like. Processing circuitry 603 comprises server blades, circuit boards, bus interfaces, integrated circuitry, and associated electronics. Storage system 604 comprises non-transitory, machine-readable, data storage media, such as flash drives, disc drives, memory circuitry, servers, and the like. Software 605 comprises machine-readable instructions that control the operation of processing circuitry 603 when executed. Software 605 includes software modules 606 and may also include operating systems, hypervisors, applications, data structures, virtual network elements, utilities, and the like. SDN server 600 may be centralized or distributed. All or portions of software 606-610 may be externally stored on one or more storage media, such as circuitry, discs, and the like. Some conventional aspects of SDN server 600 are omitted for clarity, such as power supplies, enclosures, and the like.

When executed by processing circuitry 603, software modules 606-610 direct circuitry 603 to perform the following operations. SDN application modules 606 process user and network data to drive SDN controller modules 608 to deliver data communication services to users. SDN north module 607 exchanges these SDN controller API calls and responses between SDN application modules 606 and SDN controller modules 608. SDN controller modules 608 process the SDN controller API calls to generate SDN data machine API calls to drive SDN data machines (not shown) to deliver data communication services to users. SDN south module 609 exchanges these SDN data machine API calls and responses between SDN controller modules 608 and the SDN data machines over data machine transceivers 611-613. SDN modules 606-609 generate and transfer SDN KPI data for SDN chatter and user data exchanges, north and south response times, FDT update times, and the like. SDN QoS module 610 processes the SDN KPIs to generate SDN QoS scores for a data network, data machine, network service, NFVI, NFV service descriptor, NFV forwarding graph, or NFV VNF.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method of operating a data communication system to determine Software Defined Network (SDN) Quality-of-Service (QoS) for a data communication service, the method comprising:
   SDN controller circuitry receiving SDN controller Application Programming Interface (API) calls from an SDN application for the data communication service, and in response, transferring SDN data machine API calls;
   SDN data machines receiving the SDN data machine API calls and processing user data responsive to the SDN data machine API calls for the data communication service;
   the SDN controller circuitry determining and transferring SDN controller Key Performance Indicators (KPIs) that indicate an amount of the SDN application API calls for the SDN data machine API calls;
   the SDN data machines determining and transferring SDN data machine KPIs that indicate an amount of the processed user data for the SDN data machine API calls;
   SDN server circuitry receiving the SDN data machine KPIs and the SDN controller KPIs and determining a SDN QoS for the data communication service based on the amount of the SDN application API calls relative to the corresponding amount of the processed user data;
   the SDN controller circuitry determining and transferring additional SDN controller KPIs that indicate SDN data machine response times based on the SDN data machine API calls and SDN data machine API responses; and
   the SDN server circuitry receiving the additional SDN controller KPIs and wherein determining the SDN QoS score comprises determining the SDN QoS score based on the SDN data machine response times and the amount of the SDN application API calls relative to the corresponding amount of the processed user data.

2. The method of claim 1 wherein determining the SDN QoS score comprises determining the SDN QoS score based on the amount of the SDN application API calls relative to the corresponding amount of the processed user data and based on an amount of the SDN data machine API calls relative to the corresponding amount of the processed user data.

3. The method of claim 1 further comprising:
   the SDN controller circuitry determining and transferring other additional SDN controller KPIs that indicate SDN controller response times based on the SDN controller API calls and SDN controller API responses; and the SDN server circuitry receiving the other additional SDN controller KPIs and wherein determining the SDN QoS score comprises determining the SDN QoS score based on the SDN controller response times and the amount of the SDN application API calls relative to the corresponding amount of the processed user data.

4. The method of claim 1 further comprising:
the SDN controller circuitry determining and transferring other additional SDN controller KPIs that indicate SDN application processing times based on the SDN controller API calls, the SDN data machine API calls, SDN data machine API responses, and SDN controller API responses; and
the SDN server circuitry receiving the other additional SDN controller KPIs and wherein determining the SDN QoS score comprises determining the SDN QoS score based on the SDN application processing times and the amount of the SDN application API calls relative to the corresponding amount of the processed user data.

5. The method of claim 1 further comprising:
the SDN controller circuitry determining and transferring other additional SDN controller KPIs that indicate SDN Flow Descriptor Table (FDT) update times based on the SDN controller API calls, the SDN data machine API calls, SDN data machine API responses, and SDN controller API responses; and
the SDN server circuitry receiving the other additional SDN controller KPIs and wherein determining the SDN QoS score comprises determining the SDN QoS score based on the SDN FDT update times and the amount of the SDN application API calls relative to the corresponding amount of the processed user data.

6. The method of claim 1 wherein determining the SDN QoS score for the data communication service comprises determining the SDN QoS score specific to a data communication service user.

7. The method of claim 1 wherein determining the SDN QoS score for the data communication service comprises determining the SDN QoS score specific to a data communication service user data flow.

8. The method of claim 1 wherein determining the SDN QoS score for the data communication service comprises determining the SDN QoS score specific to a Network Function Virtualization Infrastructure (NFVI).

9. The method of claim 1 wherein determining the SDN QoS score for the data communication service comprises determining the SDN QoS score specific to a Network Function Virtualization Service Descriptor (NFV SD).

10. A data communication system to determine Software Defined Network (SDN) Quality-of-Service (QoS) for a data communication service, the data communication system comprising:
SDN controller circuitry configured to receive SDN controller Application Programming Interface (API) calls from an SDN application for the data communication service, and in response, transfer SDN data machine API calls;
SDN data machines configured to receive the SDN data machine API calls and responsively process user data responsive to the SDN data machine API calls for the data communication service;
the SDN controller circuitry configured to determine and transfer SDN controller Key Performance Indicators (KPIs) that indicate an amount of the SDN application API calls for the SDN data machine API calls;
the SDN data machines configured to determine and transfer SDN data machine KPIs that indicate an amount of the processed user data for the SDN data machine API calls;
SDN server circuitry configured to receive the SDN data machine KPIs and the SDN controller KPIs and determine a SDN QoS for the data communication service based on the amount of the SDN application API calls relative to the corresponding amount of the processed user data;
the SDN controller circuitry configured to determine and transfer additional SDN controller KPIs that indicate SDN data machine response times based on the SDN data machine API calls and SDN data machine API responses; and
the SDN server circuitry configured to receive the additional SDN controller KPIs and determine the SDN QoS score based on the SDN data machine response times and the amount of the SDN application API calls relative to the corresponding amount of the processed user data.

11. The data communication system of claim 10 wherein the SDN server circuitry is configured to determine the SDN QoS score based on the amount of the SDN application API calls relative to the corresponding amount of the processed user data and based on an amount of the SDN data machine API calls relative to the corresponding amount of the processed user data.

12. The data communication system of claim 10 further comprising:
the SDN controller circuitry configured to determine and transfer other additional SDN controller KPIs that indicate SDN controller response times based on the SDN controller API calls and SDN controller API responses; and
the SDN server circuitry configured to receive the other additional SDN controller KPIs and determine the SDN QoS score based on the SDN controller response times and the amount of the SDN application API calls relative to the corresponding amount of the processed user data.

13. The data communication system of claim 10 further comprising:
the SDN controller circuitry configured to determine and transfer other additional SDN controller KPIs that indicate SDN application processing times based on the SDN controller API calls, the SDN data machine API calls, SDN data machine API responses, and SDN controller API responses; and
the SDN server circuitry configured to receive the other additional SDN controller KPIs and determine the SDN QoS score based on the SDN application processing times and the amount of the SDN application API calls relative to the corresponding amount of the processed user data.

14. The data communication system of claim 10 further comprising:
the SDN controller circuitry configured to determine and transfer other additional SDN controller KPIs that indicate SDN Flow Descriptor Table (FDT) update times based on the SDN controller API calls, the SDN data machine API calls, SDN data machine API responses, and SDN controller API responses; and
the SDN server circuitry configured to receive the other additional SDN controller KPIs and determine the SDN QoS score based on the SDN FDT update times and the amount of the SDN application API calls relative to the corresponding amount of the processed user data.

15. The data communication system of claim 10 the SDN server circuitry is configured to determine the SDN QoS score specific to a data communication service user.

16. The data communication system of claim 10 the SDN server circuitry is configured to determine the SDN QoS score specific to a data communication service user data flow.

17. The data communication system of claim 10 the SDN server circuitry is configured to determine the SDN QoS score specific to a Network Function Virtualization Infrastructure (NFVI).

18. The data communication system of claim 10 the SDN server circuitry is configured to determine the SDN QoS score specific to a Network Function Virtualization Service Descriptor (NFVSD).

* * * * *